United States Patent
Muehlbauer et al.

(10) Patent No.: US 12,492,915 B2
(45) Date of Patent: Dec. 9, 2025

(54) SYSTEM AND METHOD FOR PROVIDING A NAVIGATION MAP TO A VEHICLE

(71) Applicant: Bayerische Motoren Werke Aktiengesellschaft, Munich (DE)

(72) Inventors: Ulrich Muehlbauer, Munich (DE); Christian Denich, Munich (DE); Sabrina Denich, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 190 days.

(21) Appl. No.: 18/550,071

(22) PCT Filed: Jan. 21, 2022

(86) PCT No.: PCT/EP2022/051374
§ 371 (c)(1),
(2) Date: Sep. 11, 2023

(87) PCT Pub. No.: WO2022/199902
PCT Pub. Date: Sep. 29, 2022

(65) Prior Publication Data
US 2024/0159556 A1    May 16, 2024

(30) Foreign Application Priority Data
Mar. 26, 2021 (DE) .............. 10 2021 107 716.8

(51) Int. Cl.
*G01C 21/00* (2006.01)
(52) U.S. Cl.
CPC ....... *G01C 21/3833* (2020.08); *G01C 21/387* (2020.08); *G01C 21/3896* (2020.08)
(58) Field of Classification Search
CPC .............. G01C 21/387; G01C 21/3896; G01C 21/3833
See application file for complete search history.

(56) References Cited

U.S. PATENT DOCUMENTS

| 10,935,385 B2 * | 3/2021 | Ohyama ............ G01C 21/3848 |
| 2008/0147305 A1 | 6/2008 | Kawamata et al. |

(Continued)

FOREIGN PATENT DOCUMENTS

| EP | 2053357 A1 | 4/2009 |
| JP | 2007114100 A | 5/2007 |

OTHER PUBLICATIONS

International Search Report corresponding to International Patent Application No. PCT/EP2022/051374, dated May 4, 2022 (4 pages).

(Continued)

*Primary Examiner* — Dino Kujundzic
(74) *Attorney, Agent, or Firm* — Maginot, Moore & Beck LLP

(57) ABSTRACT

A method for providing a navigation map to a vehicle includes receiving, at a server, a request message in order to update the navigation map of the vehicle. The method further includes ascertaining a change to a portion of the navigation map of the vehicle on the basis of the received request message from the vehicle and on the basis of a current portion of the navigation map of the server outside the vehicle. In addition, the method includes determining a scope of change for the portion of the navigation map of the vehicle on the basis of the ascertained change, and checking whether the determined scope of change for the portion of the navigation map of the vehicle equals, exceeds, or falls below a predefined threshold value. A response message for updating the navigation map of the vehicle is generated based on the determined scope of change.

20 Claims, 2 Drawing Sheets

(56) References Cited

U.S. PATENT DOCUMENTS

| | | |
|---|---|---|
| 2010/0161219 A1 | 6/2010 | Lo et al. |
| 2010/0286906 A1 | 11/2010 | Nogawa et al. |
| 2011/0179080 A1* | 7/2011 | Miyazaki ................ G06F 16/29 |
| | | 707/769 |
| 2011/0191285 A1* | 8/2011 | Sawai ................ G01C 21/3878 |
| | | 707/E17.022 |
| 2012/0023057 A1* | 1/2012 | Winberry ............... G09B 29/00 |
| | | 706/50 |
| 2013/0006925 A1* | 1/2013 | Sawai ................ G01C 21/3815 |
| | | 707/E17.005 |
| 2020/0104290 A1 | 4/2020 | Sakaguchi et al. |
| 2020/0300640 A1* | 9/2020 | Hong ................ G01C 21/3889 |
| 2021/0004363 A1* | 1/2021 | Bailly ..................... G06T 17/05 |

OTHER PUBLICATIONS

Written Opinion corresponding to International Patent Application No. PCT/EP2022/051374, dated May 4, 2022 (7 pages).
German Search Report corresponding to German Patent Application No. 10 2021 107 716.8, dated Sep. 29, 2021. (6 pages).

* cited by examiner

SYSTEM AND METHOD FOR PROVIDING A NAVIGATION MAP TO A VEHICLE

CROSS-REFERENCE TO RELATED APPLICATIONS

The present application is the U.S. national phase of PCT Application PCT/EP2022/051374 filed on Jan. 21, 2022, which claims priority of German patent application No. 10 2021 107 716.8, filed Mar. 26, 2021, which is incorporated herein by reference in its entirety.

FIELD

The present disclosure relates to a method for providing a navigation map to a vehicle. The present disclosure further relates to a computer-readable medium for providing a navigation map to a vehicle, a system for providing a navigation map to a vehicle, and a vehicle which comprises the system for providing a navigation map to the vehicle.

BACKGROUND

Vehicles frequently have an Internet-enabled communication connection via which navigation maps can be updated. The vehicle can transmit a request to a server and receive the updated navigation map from the server. The updating of the navigation map of a vehicle is a highly data-intensive service with large data volumes which have to be transmitted from a server to a vehicle. The transmission of the navigation map requires high bandwidths of the Internet-enabled communication connection, which can result in high transmission costs.

SUMMARY

In view of the foregoing, it would be advantageous to update the navigation map of a vehicle more efficiently. In particular, one advantageous embodiment of the present disclosure is to provide data of a navigation map of a vehicle more efficiently from a server to a vehicle.

According to a first embodiment, a method for providing a navigation map to a vehicle is provided. The method can be a computer-implemented method and/or a control-unit-implemented method. The vehicle can be a motor vehicle. The vehicle can comprise a navigation system which is preferably integrated into the vehicle. The navigation map of the vehicle can be stored in a non-volatile and/or volatile memory, in particular a non-volatile and/or volatile memory of a navigation system of the vehicle. The vehicle can comprise a communication interface, for example a mobile radio interface and/or a WLAN interface which enables communication with a server outside the vehicle.

In at least one embodiment, the method comprises receiving, by means of a server outside the vehicle, a request message in order to update the navigation map of the vehicle. The server outside the vehicle can, for example, be a server of a cloud computing system. The method further comprises ascertaining, by means of the server outside the vehicle, a change to a portion of the navigation map of the vehicle on the basis of the received request message from the vehicle and on the basis of a current portion of the navigation map of the server outside the vehicle. The portion of the navigation map can be a location, a region, a part of a country, a country, a continent, and/or parts thereof. The portion of the navigation map can comprise a predefined area which is specified, for example, by a manufacturer of the navigation map. The current navigation map is preferably stored on the server outside the vehicle and, for each portion of the navigation map, comprises the respective latest version of the navigation map. In other words the latest version of the navigation map is always available on the server outside the vehicle.

In at least one embodiment, the method comprises determining, by means of the server outside the vehicle, a scope of change for the portion of the navigation map of the vehicle on the basis of the ascertained change. The method further checks whether the determined scope of change for the portion of the navigation map of the vehicle equals or exceeds a predefined threshold value. The predefined threshold value can specify a scope of change for the changes to the navigation map which must at least be satisfied so that the changes to the navigation map are transmitted from the server outside the vehicle to the vehicle. If the determined scope of change for the portion of the navigation map of the vehicle equals or exceeds the predefined threshold value, the method generates a response message comprising the at least one portion of the navigation map of the vehicle in order to update the navigation map of the vehicle by means of the server outside the vehicle. If the determined scope of change for the portion of the navigation map of the vehicle is less than the predefined threshold value of the scope of change, the method generates a response message comprising an indication which is representative of a scope of change that falls below the predefined threshold value. The generated response message is provided from the server outside the vehicle to the vehicle using the method.

The foregoing method advantageously provides the vehicle only with a scope of change which equals or exceeds the threshold value. The vehicle therefore only receives changes which have been evaluated as important and/or have a large scope of change. Changes with a smaller and/or unimportant scope of change are not transmitted from the server outside the vehicle to the vehicle. The data volume which is transmitted from the server outside the vehicle to the vehicle can thus be efficiently reduced without adversely affecting a use of the navigation map for a user of the vehicle. Updates of the navigation map can therefore be provided more efficiently from the server outside the vehicle to the vehicle.

According to at least one embodiment disclosed herein, the method can further comprise generating, by means of the vehicle, the request message for updating the navigation map of the vehicle, wherein the request message is preferably generated following a start-up of the vehicle or a start-up of a control unit or other computer processor of the vehicle. The method can further comprise transmitting the request message for updating the navigation map of the vehicle from the vehicle to the server outside the vehicle, wherein the request message is preferably transmitted from the vehicle to the server outside the vehicle following a start-up of the vehicle or a start-up of a control unit of the vehicle. The vehicle can thus proactively request an updated navigation map from the server outside the vehicle. A user of the vehicle automatically receives the important changes to the navigation map when the vehicle is started up and/or a control unit of the vehicle is started up.

According to a further advantageous embodiment disclosed herein, the request message for updating the navigation map can comprise an update status parameter for the portion of the navigation map of the vehicle, and/or the request message for updating the navigation map can comprise an update status parameter for each portion of the navigation map of the vehicle. The request message can further comprise a designator of the vehicle which preferably uniquely identifies the vehicle. The vehicle can thus efficiently communicate a current status of the navigation map of the vehicle to the server outside the vehicle. The server outside the vehicle can receive the current status of the navigation map of the vehicle with each request and can therefore ascertain an updating of the navigation map in a vehicle-specific manner.

According to a further advantageous embodiment disclosed herein, the portion of the navigation map can comprise a predefined geographical region of the navigation map. The updating of the navigation map can thus be efficiently ascertained for predefined geographical areas or regions.

According to a further advantageous embodiment disclosed herein, ascertaining, by means of the server outside the vehicle, a change for the portion of the navigation map of the vehicle on the basis of the received request message from the vehicle and the current portion of the navigation map of the server outside the vehicle can comprise determining, by means of the server outside the vehicle, the portion of the navigation map of the vehicle on the basis of the update status parameter of the request message, determining the current portion of the navigation map of the server outside the vehicle, comparing, for each route section of the portion of the navigation map, whether a change to a route section between the determined portion of the navigation map of the vehicle and the current portion of the navigation map of the server outside the vehicle is present, and determining the type of change to the route section if a change to the route section is present. Relative changes between the portion of the navigation map of the vehicle and the current portion of the navigation map of the server outside the vehicle can thus be efficiently ascertained. The relative changes to the route sections can preferably be pre-calculated for each portion of the navigation map on the server outside the vehicle. This can result in the changes to the route sections being ascertained more quickly by the server outside the vehicle.

According to a further advantageous embodiment disclosed herein, determining, by means of the server outside the vehicle, a scope of change for the portion of the navigation map of the vehicle on the basis of the ascertained change can comprise determining a criticality value for the ascertained change to the portion of the navigation map, determining a relevance value for the ascertained change to the portion of the navigation map, and calculating the scope of change for the portion of the navigation map on the basis of the determined criticality value of the ascertained change and the determined relevance value of the ascertained change. The change of scope is preferably an indicator for the importance of a change to a portion of the navigation map for the vehicle from which the request message has been received. The importance of a change to the navigation map for the requesting vehicle can thus be efficiently ascertained.

According to a further advantageous embodiment disclosed herein, the criticality value can be determined for each of the ascertained changes to the route sections of the portion of the navigation map, and/or the criticality value can be determined for a change to a route section on the basis of the type of change to the route section, and/or the relevance value can be determined for each of the ascertained changes to the route sections of the portion of the navigation map, and/or the relevance value for a change to a route section of the portion of the navigation map can be determined on the basis of a driving profile of the vehicle and/or a current navigation route of the vehicle and/or a current position of the vehicle. The scope of change can thus be ascertained more efficiently in a context-based manner.

According to a further advantageous embodiment disclosed herein, providing the generated response message from the server outside the vehicle to the vehicle can comprise transmitting the generated response message from the server outside the vehicle to the vehicle, receiving, by means of the vehicle, the response message from the server outside the vehicle, and updating, by means of the vehicle, the navigation map of the vehicle on the basis of the received response message from the server outside the vehicle if the response message comprises one or more portions of the navigation map. One or more portions of the navigation map can thus be provided to the vehicle.

According to a further advantageous embodiment, a computer-readable medium is provided for providing a navigation map to a vehicle, wherein the computer-readable medium comprises instructions which, when executed on a computer and/or a control unit, carry out the method described above.

According to a further advantageous embodiment, a system is provided for providing a navigation map to a vehicle, wherein the system is designed to carry out the method described above.

According to a further advantageous embodiment, a vehicle is provided comprising the system described above for providing a navigation map to a vehicle.

Further features of the present disclosure are set out in the claims, the figures and the description of the figures. All features and feature combinations mentioned above in the description and the features and feature combinations mentioned below in the description of the figures and/or shown in the figures alone are usable not only in the respectively indicated combination, but also in other embodiments and combinations or in isolation.

BRIEF DESCRIPTION OF THE DRAWINGS

At least one preferred exemplary embodiment of the system and method for providing a navigation map to a vehicle is described below with reference to the attached drawings. Further details, preferred embodiments and developments are set out in the drawings, wherein, in detail.

DESCRIPTION

Figure 1:
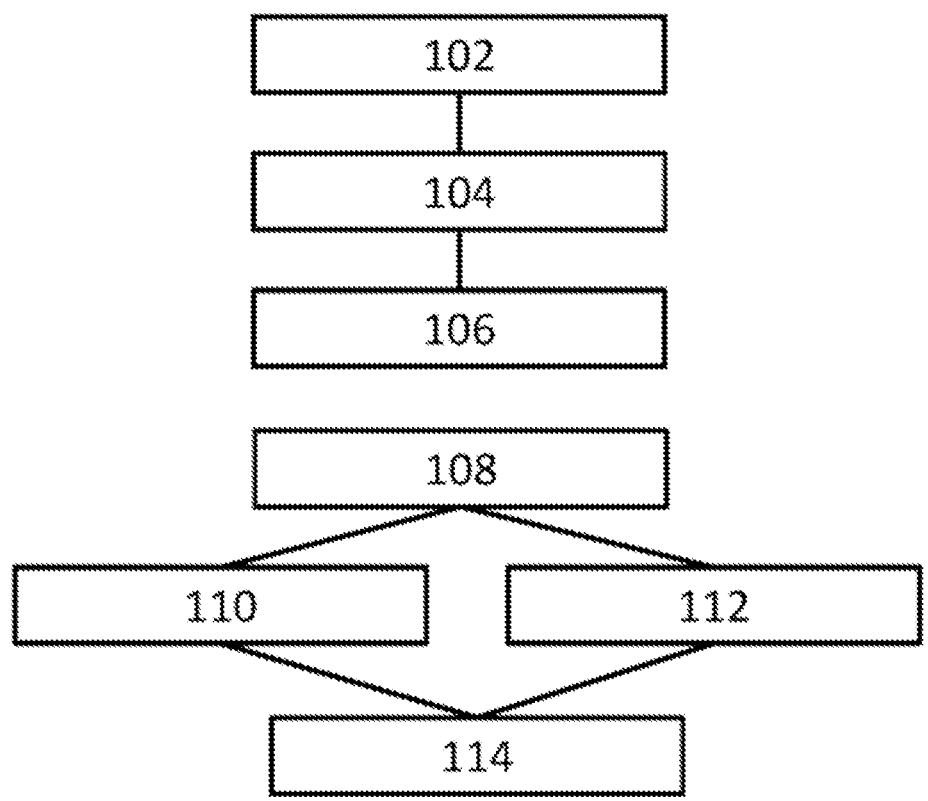
FIG. 1 shows schematically an example of a method for providing a navigation map to a vehicle.
Figure 2:
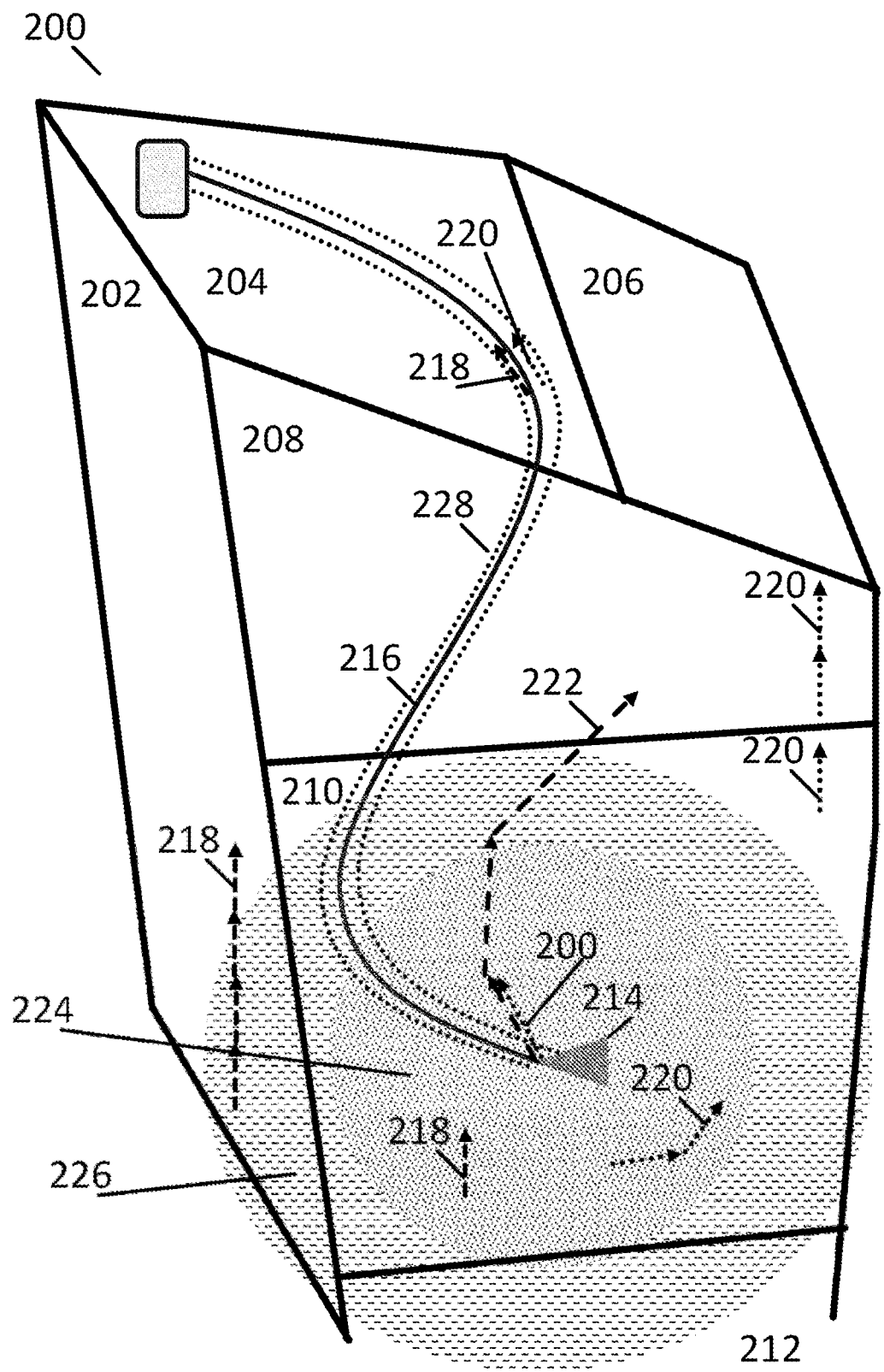
FIG. 2 shows schematically an example of a navigation map.

With reference now to the drawings, FIG. 1 shows an example of a method 100 for providing a navigation map to a vehicle. Portions of a navigation map having a differing update status can be stored on a vehicle. FIG. 2 shows an example of a navigation map 200 of the vehicle. The navigation map 200 of the vehicle can comprise a plurality of portions 202, 204, 206, 208, 210, 212. Each portion 202, 204, 206, 208, 210, 212 of the navigation map 200 can correspond, for example, to a region. Each portion 202, 204, 206, 208, 210, 212 of the navigation map can comprise an update status parameter which indicates the update status of a respective portion of the navigation map. The update status parameter can be time information, for example a time-stamp, and/or a unique designator of a version of a portion of the navigation map. Each portion 202, 204, 206, 208, 210, 212 of the navigation map of the vehicle can have a different update status parameter. The update status of each portion 202, 204, 206, 208, 210, 212 of the navigation map of the vehicle can be different. The vehicle can generate a request message following a start-up of the vehicle and includes a transmitter that can transmit it to a server outside the vehicle. The request message preferably comprises the update status parameter for each portion 202, 204, 206, 208, 210, 212 of the navigation map of the vehicle. The request message can further comprise a unique vehicle designator, for example a vehicle identification number. The request message can additionally comprise a current position 214 of the vehicle and/or a current navigation route 216 of the vehicle.

The method 100 can receive 102 the request message for updating the navigation map of the vehicle by means of a receiver associated with the server outside the vehicle. The method can further ascertain 104 a change for a portion of the navigation map of the vehicle on the basis of the received request message from the vehicle and on the basis of a current portion of the navigation map of the server outside the vehicle by means of the server outside the vehicle. Additionally or alternatively, the method 100 can ascertain changes for all portions of the navigation map of the vehicle for which an update parameter is present in the request message. The server outside the vehicle can determine the portion of the navigation map of the vehicle by means of the update parameter and ascertain changes between the portion of the navigation map and the current portion of the navigation map. To do this, the server outside the vehicle can determine a change for each route section of a portion of the navigation map. The server outside the vehicle can additionally determine what type of change is involved. A type of change can, for example, be a newly added route section, a removed route section, or a changed route section.

As shown in FIG. 2, the server outside the vehicle can ascertain a change 218 in the portion 202 of the navigation map, changes 218, 220 in the portion 204, no changes in the portion 206 of the navigation map, change 220 in the portion 208 of the navigation map, and changes 218, 220 in the portion 210 of the navigation map. The changes 218 are route sections that have been newly added, and the changes 220 are route sections that have been removed.

The method 100 can further determine 106 a scope of change for at least one portion of the navigation map of the vehicle by means of the server outside the vehicle. The server outside the vehicle preferably determines the scope of change for each portion of the navigation map for which the update parameter has been received from the vehicle. If no change has been ascertained by the server outside the vehicle for a portion of the navigation map, the scope of change is 0. If at least one change has been ascertained by the server outside the vehicle, the server outside the vehicle can determine 106 the scope of change.

For determining 106 the scope of change, the method 100 can determine a criticality value for an ascertained change of a portion of the navigation map. The criticality value can be determined for each of the ascertained changes to the route sections of the portion of the navigation map. In particular, the criticality value can be determined for a change to a route section of the portion of the navigation map on the basis of the type of change to the route section. The criticality value indicates how important the change is for navigation based on the navigation map. For example, a newly added route section and/or a removed route section are important for the navigation with the navigation map and are therefore given a high criticality value. If, for example, the number of traffic lanes in a route section changes, the predefined criticality value can be low. If a speed limit changes in a route section, the criticality value can be low, since a camera of the vehicle can correct the speed limit stored in the navigation map.

The method 100 can determine a criticality value for each ascertained change to the portion of the navigation map. The method can determine a criticality value, for example, for each route change. A predefined criticality value can be assigned to each type of route change. Additionally or alternatively, the criticality value can be ascertained on the basis of a predefined function.

For ascertaining the scope of change, the method 100 can further determine a relevance value for the ascertained change to the portion of the navigation map. The relevance value can be determined for each of the ascertained changes to the route sections of a portion of the navigation map. In particular, the relevance value can be determined for a change to a route section of a portion of the navigation map on the basis of a driving profile of the vehicle and/or a current navigation route of the vehicle and/or a current position of the vehicle. The relevance value indicates how relevant the ascertained change in a portion of the navigation map is for the requesting vehicle, in particular for a driving profile and/or a current driving context of the requesting vehicle.

As shown in FIG. 2, the server outside the vehicle can evaluate a driving profile of the vehicle. The driving profile can indicate, for example, that the vehicle has frequently used the route sections 222 in the past. Using further frequently used route sections, the server outside the vehicle can define areas 224 and 226 around the current position of the vehicle in which the vehicle has frequently travelled. The area 224 is the area in which the vehicle has travelled particularly frequently, whereas the area 226 is the area in which the vehicle has travelled less frequently. It is possible to specify, for example, that the ascertained changes have a higher relevance value for a specific area in which the vehicle has travelled more frequently and/or for a specific route section or a specific sequence of route sections in which the vehicle has travelled more frequently. The server outside the vehicle can further use the current navigation route of the vehicle when determining the relevance value. To do this, the server outside the vehicle can determine a tubular area 222 around the current navigation route 216. The ascertained changes can be particularly relevant to the vehicle in the tubular area 228. The server outside the vehicle can additionally consider a road type, for example a highway, expressway and/or secondary road, when determining the relevance value. The relevance value can be ascertained by means of one or more predefined functions on the basis of the parameters described above.

The method 100 can finally calculate the scope of change for the portion of the navigation map, in particular each portion of the navigation map on the basis of the determined criticality value of the ascertained change and the determined relevance value of the ascertained change. Generally speaking, the volume of change can be defined by the following function: volume of change=f(changes, relevance, criticality). The volume of change can be calculated, for example, as the sum of the product of the relevance value and the criticality value for all changes k=0 to k=n:

$$\sum_{k=0}^{n} \text{relevance}_k * \text{criticality}_k$$

Alternatively, the volume of change can be calculated by means of the following examples of functions:

$$\sum_{k=1}^{n} \alpha * \text{relevance}_k * \beta * \text{criticality}_k$$

$$\sum_{k=1}^{n} (\text{relevance}_k)^\alpha * (\text{criticality}_k)^\beta$$

where α and β are weighting factors of the relevance value and the criticality value.

After ascertaining the scope of change, the method 100 can check 108 whether the determined scope of change for the portion of the navigation map of the vehicle equals a predefined threshold value or exceeds a predefined threshold value. The predefined threshold value indicates how significant the difference must be between the navigation map of the vehicle and the current navigation map of the server in order to update the navigation map on the vehicle. The threshold value can be changed. The threshold value can be changed, for example, by the server outside the vehicle in order to adjust the threshold value to the driving profile. As a result, the frequency of the updates to the navigation map can be controlled by the server outside the vehicle.

If the determined scope of change for the portion of the navigation map of the vehicle equals the predefined threshold or exceeds the predefined threshold value, the method 100 can generate 110 a response message to update the navigation map of the vehicle, said response message comprising one or more portions of the navigation map of the vehicle. If the determined scope of change for the portion of the navigation map of the vehicle falls below the predefined threshold value of the scope of change, the method 100 can generate 112 a response message comprising an indication which is representative of a scope of change which falls below the predefined threshold value. Finally, the method can provide 114 the generated response message from the server outside the vehicle to the vehicle.

The method advantageously performs an update of the navigation map of the vehicle only if a significant volume of change has been ascertained for the requesting vehicle. An update of the navigation map is not performed if the ascertained changes to the navigation map and, in particular, to portions of the navigation map which are stored on the vehicle are unimportant for the vehicle in terms of the driving profile and the current driving context. Fewer data of the navigation map therefore need to be transmitted from the server outside the vehicle to the vehicle. The required bandwidth for updating the navigation map can therefore be efficiently reduced.

REFERENCE SIGN LIST

100 Method
102 Receive a request message
104 Ascertain a change
106 Determine a scope of change
108 Check the scope of change
110 Generate a response message
112 Generate a response message
114 Provide the response message
200 Navigation map
202 Portion of the navigation map
204 Portion of the navigation map
206 Portion of the navigation map
208 Portion of the navigation map
210 Portion of the navigation map
212 Portion of the navigation map
214 Current position of the vehicle
216 Current navigation route
218 Change
220 Change
222 Past navigation route
224 Area
226 Area
228 Area around the current navigation route

The invention claimed is:

1. A method for providing a navigation map to a vehicle while moving, the method comprising:

receiving from the vehicle while moving, by means of a server outside the vehicle, a request message in order to update the navigation map of the vehicle;

ascertaining in real time, by means of the server outside the vehicle, a change to a portion of the navigation map of the vehicle on the basis of the received request message from the vehicle and on the basis of a current portion of the navigation map of the server outside the vehicle;

determining, by means of the server outside the vehicle, a scope of change for the portion of the navigation map of the vehicle on the basis of at least two values for the ascertained change;

checking whether the determined scope of change for the portion of the navigation map of the vehicle equals a predefined threshold value or exceeds a predefined threshold value;

when the determined scope of change for the portion of the navigation map of the vehicle equals the predefined threshold value or exceeds the predefined threshold value:

generating, by means of the server outside the vehicle, a response message for updating the navigation map of the vehicle comprising the at least one portion of the navigation map of the vehicle;

when the determined scope of change for the portion of the navigation map of the vehicle falls below the predefined threshold value:

generating a response message comprising an indication which is representative of a scope of change that falls below the predefined threshold value; and providing the generated response message from the server outside the vehicle to the vehicle, wherein providing the generated response comprises:

transmitting the generated response message from the server outside the vehicle to the vehicle while moving, wherein the generated response message is configured to cause the vehicle to update the navigation map of the vehicle when the response message comprises the at least one portion of the navigation map of the vehicle.

2. The method as claimed in claim 1, the method further comprising:

generating, by means of the vehicle, the request message for updating the navigation map of the vehicle, wherein the request message is generated following a start-up of the vehicle or a start-up of a control unit of the vehicle; and transmitting the request message for updating the navigation map of the vehicle from the vehicle to the server outside the vehicle, wherein the request message is transmitted from the vehicle to the server outside the vehicle following a start-up of the vehicle or a start-up of a control unit of the vehicle.

3. The method as claimed in claim 1, wherein the request message for updating the navigation map comprises an update status parameter for the portion of the navigation map of the vehicle; or
wherein the request message for updating the navigation comprises an update status parameter for each portion of the navigation map of the vehicle.

4. The method as claimed in claim 1, wherein the portion of the navigation map comprises a predefined geographical region of the navigation map.

5. The method as claimed in claim 1, wherein ascertaining, by means of the server outside the vehicle, a change for the portion of the navigation map of the vehicle on the basis of the received request message from the vehicle and on the basis of the current portion of the navigation map of the server outside the vehicle comprises:
determining, by means of the server outside the vehicle, the portion of the navigation map of the vehicle on the basis of the update status parameter of the request message;
determining the current portion of the navigation map of the server outside the vehicle;
comparing, for each route section of the portion of the navigation map, whether a change to a route section between the determined portion of the navigation map of the vehicle and the current portion of the navigation map of the server outside the vehicle is present; and
determining the type of change to the route section when a change to the route section is present.

6. The method as claimed in claim 1, wherein determining, by means of the server outside the vehicle, a scope of change for the portion of the navigation map of the vehicle on the basis of at least two values for the ascertained change comprises:
determining a criticality value for the ascertained change to the portion of the navigation map;
determining a relevance value for the ascertained change to the portion of the navigation map; and
calculating the scope of change for the portion of the navigation map on the basis of the determined criticality value of the ascertained change and the determined relevance value of the ascertained change.

7. The method as claimed in claim 6, wherein the criticality value is determined for each of the ascertained changes to the route sections of the portion of the navigation map; or
wherein the criticality value is determined for a change to a route section on the basis of the type of change to the route section; or
wherein the relevance value is determined for each of the ascertained changes to the route sections of the portion of the navigation map; or
wherein the relevance value for a change to a route section of the portion of the navigation map is determined on the basis of a driving profile of the vehicle and/or a current navigation route of the vehicle or a current position of the vehicle.

8. The method as claimed in claim 1, wherein providing the generated response message from the server outside the vehicle to the vehicle further comprises:
receiving, by means of the vehicle, the response message from the server outside the vehicle; and
updating, by means of the vehicle, the navigation map of the vehicle on the basis of the received response message from the server outside the vehicle when the response message comprises the at least one portion of the navigation map.

9. A non-transient computer readable medium for providing a navigation map to a vehicle while moving, wherein the computer-readable medium comprises instructions which, when executed on a processor of a server, causes the server to:
receive a request message from the vehicle while moving in order to update the navigation map of the vehicle;
ascertain in real time a change to a portion of the navigation map of the vehicle on the basis of the received request message from the vehicle and on the basis of a current portion of the navigation map of the server outside the vehicle;
determine a scope of change for the portion of the navigation map of the vehicle on the basis of at least two values for the ascertained change;
check whether the determined scope of change for the portion of the navigation map of the vehicle equals a predefined threshold value or exceeds a predefined threshold value;
when the determined scope of change for the portion of the navigation map of the vehicle equals the predefined threshold value or exceeds the predefined threshold value:
generate a response message for updating the navigation map of the vehicle comprising the at least one portion of the navigation map of the vehicle;
when the determined scope of change for the portion of the navigation map of the vehicle falls below the predefined threshold value of the scope of change:
generate a response message comprising an indication which is representative of a scope of change that falls below the predefined threshold value; and
transmit the generated response message from the server to the vehicle while moving, wherein the generated response is configured to cause the vehicle to update the navigation map of the vehicle when the response message comprises the at least one portion of the navigation map of the vehicle.

10. The non-transient computer-readable medium of claim 9, wherein the request message for updating the navigation map comprises an update status parameter for the portion of the navigation map of the vehicle; or
wherein the request message for updating the navigation comprises an update status parameter for each portion of the navigation map of the vehicle.

11. The non-transient computer-readable medium of claim 9, wherein the portion of the navigation map comprises a predefined geographical region of the navigation map.

12. The non-transient computer-readable medium of claim 9, wherein the instructions that cause the server to ascertain a change for the portion of the navigation map of the vehicle include instructions that cause the server to:
determine the portion of the navigation map of the vehicle on the basis of the update status parameter of the request message;
determine the current portion of the navigation map of the server outside the vehicle;
compare, for each route section of the portion of the navigation map, whether a change to a route section between the determined portion of the navigation map of the vehicle and the current portion of the navigation map of the server outside the vehicle is present; and
determine the type of change to the route section when a change to the route section is present.

13. The non-transient computer-readable medium of claim 9, wherein the instructions that cause the server to determine a scope of change for the portion of the navigation map of the vehicle include instructions that cause the server to:
- determine a criticality value for the ascertained change to the portion of the navigation map;
- determine a relevance value for the ascertained change to the portion of the navigation map; and
- calculate the scope of change for the portion of the navigation map on the basis of the determined criticality value of the ascertained change and the determined relevance value of the ascertained change.

14. The non-transient computer-readable medium of claim 13, wherein the criticality value is determined for each of the ascertained changes to the route sections of the portion of the navigation map; or
- wherein the criticality value is determined for a change to a route section on the basis of the type of change to the route section; or
- wherein the relevance value is determined for each of the ascertained changes to the route sections of the portion of the navigation map; or
- wherein the relevance value for a change to a route section of the portion of the navigation map is determined on the basis of a driving profile of the vehicle and/or a current navigation route of the vehicle or a current position of the vehicle.

15. A system comprising:
- a vehicle including a transmitter configured to transmit a request message in order to update a navigation map of the vehicle; and
- a server outside of the vehicle, the server including a receiver configured to receive the request message, the server further configured to:
  - ascertain a change to a portion of the navigation map of the vehicle on the basis of the received request message from the vehicle and on the basis of a current portion of the navigation map of the server outside the vehicle;
  - determine a scope of change for the portion of the navigation map of the vehicle on the basis of at least two values for the ascertained change;
  - check whether the determined scope of change for the portion of the navigation map of the vehicle equals a predefined threshold value or exceeds a predefined threshold value;
  - when the determined scope of change for the portion of the navigation map of the vehicle equals the predefined threshold value or exceeds the predefined threshold value:
    - generate a response message for updating the navigation map of the vehicle comprising the at least one portion of the navigation map of the vehicle;
  - when the determined scope of change for the portion of the navigation map of the vehicle falls below the predefined threshold value of the scope of change:
    - generate a response message comprising an indication which is representative of a scope of change that falls below the predefined threshold value;
  - transmit the generated response message from the server to the vehicle;
- receive the response message from the server at the vehicle; and
- update the navigation map of the vehicle on the basis of the received response message from the server outside the vehicle when the response message comprises the at least one portion of the navigation map of the vehicle.

16. The system of claim 15, wherein the vehicle is further configured to generate the request message for updating the navigation map of the vehicle, wherein the request message is generated following a start-up of the vehicle or a start-up of a control unit of the vehicle; and
- wherein the request message is transmitted from the vehicle to the server outside the vehicle following a start-up of the vehicle or a start-up of a control unit of the vehicle.

17. The system of claim 15, wherein the request message for updating the navigation map comprises an update status parameter for the portion of the navigation map of the vehicle; or
- wherein the request message for updating the navigation comprises an update status parameter for each portion of the navigation map of the vehicle.

18. The system of claim 15, wherein the portion of the navigation map comprises a predefined geographical region of the navigation map.

19. The system of claim 15, wherein the server is further configured to:
- determine the portion of the navigation map of the vehicle on the basis of the update status parameter of the request message;
- determine the current portion of the navigation map of the server outside the vehicle;
- compare, for each route section of the portion of the navigation map, whether a change to a route section between the determined portion of the navigation map of the vehicle and the current portion of the navigation map of the server outside the vehicle is present; and
- determine the type of change to the route section when a change to the route section is present.

20. The system of claim 15, wherein the server is further configured to:
- determine a criticality value for the ascertained change to the portion of the navigation map;
- determine a relevance value for the ascertained change to the portion of the navigation map; and
- calculate the scope of change for the portion of the navigation map on the basis of the determined criticality value of the ascertained change and the determined relevance value of the ascertained change when determining a scope of change for the portion of the navigation map of the vehicle on the basis of at least two values for the ascertained change.

* * * * *